May 26, 1964     A. FEIBUSH     3,134,391
SAFETY DEVICE FOR FLUID PRESSURE SYSTEMS
Filed Sept. 7, 1961
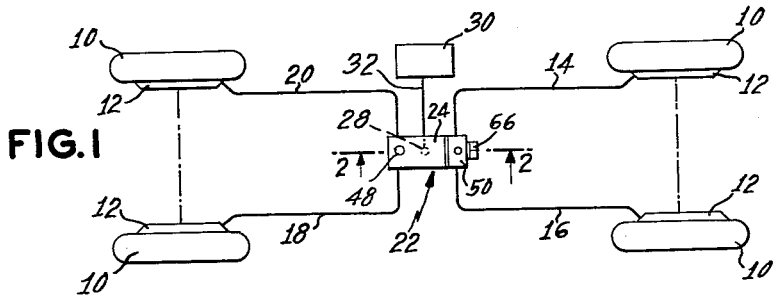
FIG. 1
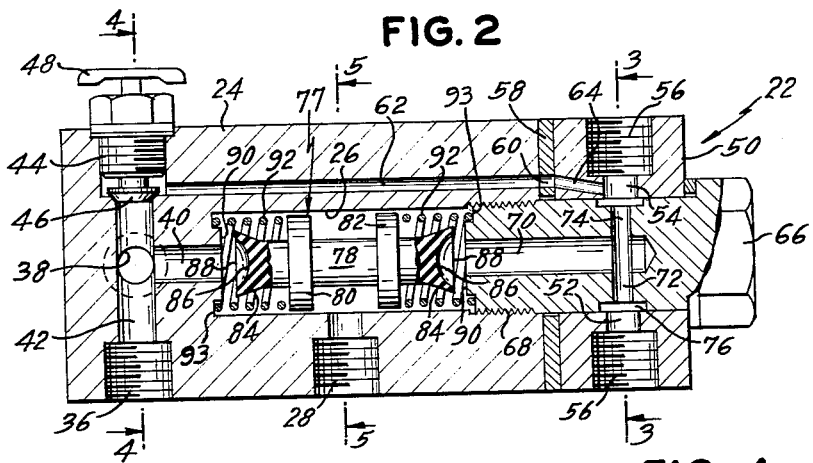
FIG. 2
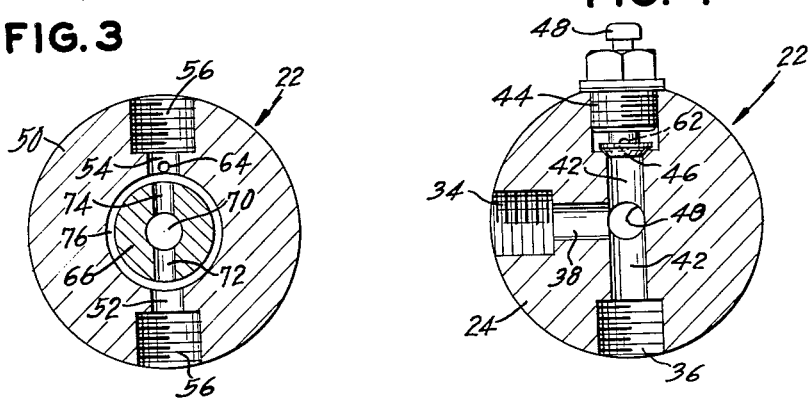
FIG. 3
FIG. 4
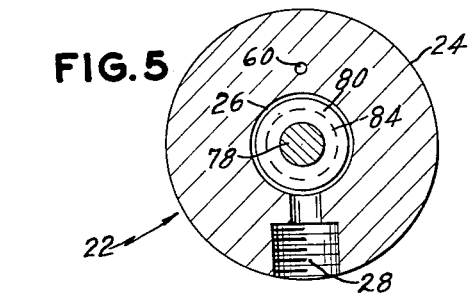
FIG. 5
INVENTOR.
ALEXANDER FEIBUSH
BY Jerome Bauer
ATTORNEY United States Patent Office 3,134,391
Patented May 26, 1964

3,134,391
SAFETY DEVICE FOR FLUID PRESSURE
SYSTEMS
Alexander Feibush, Plainview, N.Y., assignor to Alex Manufacturing Corporation, Jamaica, N.Y., a corporation of New York
Filed Sept. 7, 1961, Ser. No. 136,661
5 Claims. (Cl. 137—118)

This invention relates to safety devices for fluid pressure systems and has particular application to such closed fluid pressure systems of the kind employed in vehicles as disclosed in co-pending application Serial No. 655,221, filed April 26, 1957, and now abandoned In fluid pressure systems where it is important that the fluid be contained so that the pressure delivered thereby is transmitted consistently and undiminished from the source to the work, it has been necessary to introduce safety devices to prevent the loss of fluid and obviate the possible diminishing of its pressure at the work. This is exemplified in the contained or closed fluid braking systems incorporated in automotive vehicles, aircraft and the like.

Hence, an object of the invention is to provide a safety device that may be incorporated in closed fluid pressure systems to prevent the loss of fluid from the system when a break should occur therein.

Another object of the invention is to provide a safety device for fluid pressure systems wherein the operation of such device does not interfere with the normal operation of the system in which it is contained.

Still another object of the invention is to provide a safety device having a valve that is normally loose and freely positioned within the path of the fluid without, however, being affected thereby until a break should occur in the system and then only move in the direction of the break to prevent the further movement of fluid and loss of the same through the break.

Another object of the invention is to provide a safety device for closed fluid pressure systems wherein the valve thereof, being normally positioned loose within the path of movement of the fluid, will not be displaced by centrifugal forces acting thereagainst. To this end, a novel feature of this invention resides in a unique arrangement of structure that cooperates with the valve only when the same moves in response to centrifugal forces acting thereagainst to restrain the valve from moving from its normal position but applies a zero resistance to the movement of the valve when the same is in its normal position.

Still another novel feature of the invention and an object thereof is to permit the movement of the valve from its normal position to move in the direction of any break that may occur in the system to close and prevent the further loss of fluid through such break.

A further object of the invention is to enable the fluid system to be bled after the break therein has been corrected by providing a novel arrangement of passageways that by-pass the valve member which normally continues to prevent the passage of fluid in the direction of the break until the same has been fully repaired and the system properly bled.

Other and further objects of this invention reside in the structures and arrangements hereinafter more fully described with reference to the accompanying drawing in which:

FIG. 1 is a diagrammatic view of a closed fluid pressure brake system of an automotive vehicle illustrating the use of the invention, FIG. 2 is a cross-section of FIG. 1 taken along lines 2—2, FIG. 3 is a cross-section of FIG. 2 taken along lines 3—3, FIG. 4 is a cross-section of FIG. 2 taken along lines 4—4, and FIG. 5 is a cross-section of FIG. 2 taken along lines 5—5.

Referring now to the drawing and in particular to FIG. 1 thereof, there is disclosed a diagrammatic arrangement of the four wheels of an automotive vehicle, each wheel being identified by the numeral 10. Each wheel 10 has a brake mechanism 12 that is connected by a respective fluid brake line 14, 16, 18 and 20 with the safety brake devices generally identified by the numeral 22.

The safety device 22 comprises a housing 24 that has an interior fluid chamber 26. The housing 24 is elongated in length as is the fluid pressure chamber 26 defined therein. Communicating with the fluid chamber 26 is a fluid inlet 28 that serves to provide fluid under pressure to the chamber from a master cylinder 30 that is connected therewith by a fluid conduit 32. Fluid in the master cylinder 30 is adapted to be placed under pressure by the application of the foot brake (not shown) of the vehicle. This pressure is transmitted from the cylinder 30 through conduit 32 and inlet 28 to the chamber 26.

The front wheel fluid brake lines 18 and 20 are connected with the housing 24 at the threaded openings 34 and 36 respectively (FIGS. 2 and 4). The openings 34 and 36 serve as individual fluid outlets that communicate with the chamber 26. The one fluid outlet 34 is provided with a passageway 38 that is in communication with a longitudinally extending common fluid outlet passageway 40 that serves to connect the fluid outlet 34 and the brake line 18 with the chamber 26. A diametrically directed passageway 42 serves to connect the individual fluid outlet 36 and the brake line 20 with the chamber 26 by crossing over and communicating with the end of the common fluid outlet passageway 40.

The diametrically opposite end of the passageway 42, directed away from the fluid outlet 36, contains within it a threaded element 44 in which a valve element 46 is movable. The valve element 46 normally seats against and closes the end of the diagonally directed passageway 42 but may be operated to move within its threaded element 44 as the result of the rotation of a wing-shaped actuator 48. Unseating the valve element 46 from the passageway 42 permits movement of fluid in its direction in a manner to be described.

Connected to the right hand end of the housing 24 is a cover member 50 that has a pair of diametrically directed fluid outlets 52 and 54 each of which is adapted to be connected at its enlarged threaded surface 56 with a respective one of the fluid brake lines 14 and 16. Interposed between the cover member 50 and the right hand end of the housing 24 is a washer 58. The washer 58 is provided with an aperture 60 that defines the continuation of a by-pass opening or passageway 62 defined in the housing 24 and opening 64 defined at its other side in the cover member 50. The cover member 50 and washer 58 are secured in their relative positions as illustrated in the drawing by the threaded insertion of a locking bolt 66 at 68 into the right hand end of the fluid chamber 26. It is provided with an axially extending common fluid outlet passage 70 that terminates in T-shaped passages 72 and 74 each of which are adapted to supply fluid from the chamber 26 to the fluid outlets 52 and 54 by way of an annular cutout 76 provided in the body of the locking bolt 66.

Positioned centrally within and normally spaced from the fluid outlet passages 40 and 70 is a valve member generally identified by the numeral 77 and comprising a body 78. Spaced longitudinally along the length of the body 78 are annular actuator elements 80 and 82 while the opposite ends of the valve member 77 terminate in enlarged heads 84. Each head 84 is substantially larger in size than its respective fluid outlet opening or passageway 40 or 70. The end of each head 84 facing its respective outlet is provided with a depression or concave surface 86 that is also larger in size than that of its respective fluid outlet opening 40 or 70. This results in a flat sealing surface 88 that is defined on the end face of each of the enlarged heads 84 between the concave surface 86 and the outer periphery of such head. The sealing surface 88 of each valve head 84 is adapted to seat against and be in sealing engagement with a similar sealing surface 90 provided about the face or entranceway of the outlet passages 40 and 70.

Mounted within the chamber 26 between the valve member 77 and the respective fluid outlets 40 and 70 are buffer force applying or resistance means here shown in the form of coil springs 92. The coil springs 92 seat in annular grooves 93 that retain them in position adjacent to the sealing surfaces 90 of the fluid outlets 40 and 70. When the buffer springs 92 are in their normal fully expanded condition, they do not touch and are spaced slightly from the adjacent faces of the annular elements 80 and 82 of the valve member. Hence, they do not apply a force thereagainst. Thus, it may be said that because the annular elements 80 and 82 are of slightly less diameter than that of the fluid chamber 26 within which it is positioned, the valve member 77 is loose in the chamber. Also, because the resisting spring means 92 are fully expanded and normally do not touch the annular elements 80 and 82 of the valve member 77, they may be said to apply an essentially zero force or resistance against such loose valve member when the valve member is normally positioned between the fluid outlets 40 and 70.

The normal position of the valve member occurs when the fluid pressure in the chamber 26 is in equilibrium at both the fluid inlet 28 and the outlets 40 and 70. This will be recognized by those skilled in the art who will understand that if the fluid pressure in the fluid outlets 40 and 70 equals that of the fluid pressure at the inlet 28, equal and opposite forces are applied to all the surfaces of the annular actuator elements 80 and 82 of the valve member 77 and thus the valve member always will move to its normal position wherein the same is centrally spaced from the fluid outlets 40 and 70.

When the safety device 22 is employed in an automotive vehicle and such vehicle negotiates a sharp change in direction, a centrifugal as well as other forces are applied against the valve member 77 that would tend to move the same from its normal spaced position with respect to the fluid outlets 40 and 70. Such movement of the valve member would be undesired because it could accidentally stop or restrict the movement of fluid through one of such fluid outlets. Hence, this movement must be obviated. The present invention includes the buffer springs 92 that normally apply a zero resistance against the valve member 77. However, when any such undesired forces, as a centrifugal force, is applied to the valve member, before the valve member will move in response thereto, it moves toward and then against one of the buffer means 92, compressing the same. As the means 92 is compressed, it produces an opposing force against the valve member 77 that gradually increases with the displacement of the valve member and its amount of compression.

The resistance means 92 are just sufficiently strong to overcome whatever deleterious forces may be applied against the valve member, but they are not strong enough to overcome forces that will be applied against the surfaces of the annular actuator elements 80 and 82 of the valve member in the event the fluid pressure in one of the brake lines 14, 16, 18 or 20 should be lower than that introduced into the chamber 26 at the inlet 28. Therefore, if a leak or break should occur in one of the brake lines, the brake line will be incapable of containing the fluid therein and thus will have a materially lower fluid pressure than that introduced into the chamber 26 at the inlet 28. The fluid rushing from the inlet 28 through the chamber 26 toward the fluid outlet having the lower fluid pressure will act against the surfaces of the respective annular element 80 or 82, as the case may be, and immediately move or actuate the valve member in the direction of the defective fluid outlet.

The unique shape of each of the heads 84 of the valve member 77 creates a force that aids in the rapid movement of the valve member toward the defective fluid outlet. It appears that the concave surface 86 creates an area of lower pressure that sucks or pulls the valve member in the direction of the defective fluid outlet. The surfaces 88 of the valve member then fluid tightly engages with the complementary sealing surface 90 provided about the fluid outlet and remains seated thereagainst because the lower pressure in the defective fluid outlet continues to create a differential in pressure against the concave surfaces 86 while the higher fluid pressure in the chamber 26 applies a force to the surfaces of the relevant annular element 80 or 82. Thus, the head 84 is retained in fluid-tight sealing engagement about the defective fluid outlet until such time as the defect can be repaired.

After the defective fluid line has been repaired, it is necessary to bleed the same of air that may have entered thereinto otherwise the fluid pressure operating in the lines will be hindered by whatever air bubbles may remain trapped therein. Naturally, it will be recognized that the defective line cannot be bled of air unless it is possible to force fluid therethrough. But if the head 84 of the valve member remains seated against the defective fluid outlet 40 or 70, fluid cannot be forced through the same from the inlet 28 by way of chamber 26.

To accomplish this, the actuator 48 is rotated within the threaded element 44 to lift and unseat the valve element 46 from the end of the passageway 42, thereby opening the by-pass fluid conduit that is connected with the fluid inlet 28 at either end of the chamber 26. Consequently, if the break had occurred in the fluid outlet 70 and the valve head 84 was seated in sealing relationship therewith, fluid introduced under pressure into the chamber 26 by way of the inlet 28 would pass through the opposite fluid outlet 40. From there, it would move into the diametric passageway 42, now opened by the valve element 46, and then communicated to either the brake line 14 or 16, whichever requires bleeding, by way of the by-pass opening 62, connecting aperture 60 and continuing opening 64.

In the reverse manner, if the break had occurred in either the brake line 18 or 20 and the valve head 84 were in covering fluid tight sealing engagement with the fluid outlet 40, the fluid would by-pass the closed valve member 77 by moving from the inlet 28 into chamber 26 and then into the outlet 70. From there, it would continue its movement through the passages 72 and 74 and the by-pass structure 64, 60, 62 and then either to the brake line 18 by way of the passageway 38 or to the brake line 20 by way of the passageway 42. Obviously, after the bleeding operation has been completed, the valve element 46 may once again be closed to seal off the by-pass structure. Immediately thereafter, the valve member 77 in the chamber 26 will return to its normal central position wherein its heads 84 are spaced from their respective fluid outlets 40 and 70. It is returned to its normal position because the fluid pressure in the chamber is equal. Hence, the pressure on the elements 80 and 82 is equalized. Further, its return is aided by the resistance means 92 that move the same away from the once defective fluid outlet until they return to their unrestricted fully extended condition wherein they are spaced slightly from and apply a zero resistance against the valve member.

In the preceding description, it was noted that the buffer springs 92 were mounted or seated in annular grooves 93 provided about the outlets 40 and 70. In practice, it has been found convenient in some instances to provide the grooves 93 instead on the facing surfaces of the elements 80 and 82 to mount the ends of the buffer springs 92 on the elements 80 and 82 so that the springs move with the valve 77 into buffering abutment with the respective surface about the outlets 40 and 70. Consequently, it will be clear that the buffer springs 92 do not position or normally center the valve 77, rather it functions only to overcome deleterious moving forces applied to the valve after a slight, almost unperceptible movement in response to such undesired forces. Otherwise, the valve is free and loosely mounted in the chamber 26.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A safety device for a fluid pressure system comprising a housing including a fluid inlet, a plurality of fluid outlets and a chamber connecting said fluid inlet and outlets, a valve in said chamber normally spaced from and positioned between said fluid inlet and said fluid outlets, said valve being loose in said chamber and having outlet closing ends and surfaces thereon against which fluid pressure from said inlet applies a force to move said valve toward one of said fluid outlets when the fluid pressure in said one fluid outlet is lower than that in the other of said fluid outlets, and means in said chamber exerting free of touching engagement with said outlet closing ends between said valve and each of said fluid outlets and spaced from said valve free from touching engagement therewith and from exerting a restraint against the initial movement of said valve toward said fluid outlets or from said fluid inlet when the same is in its normal position and exerting a resistance in opposition to the movement of said valve after the same has moved in said chamber toward said one fluid outlet.

2. A safety device for a fluid pressure system comprising a fluid chamber, a fluid inlet in said chamber to introduce fluid thereinto under pressure, at least two fluid outlets in said chamber each at opposite ends thereof to receive said fluid under pressure, a valve in said chamber spaced from and between each of said fluid outlets and movable to close one of said fluid outlets when the fluid pressure therein is lower than that in the other of said fluid outlets, surfaces on said valve against which fluid under pressure exerts a force to move said valve in the direction of said fluid outlet having said lower fluid pressure, the opposite ends of said valve facing respective ones of said fluid outlets each having an enlarged head of a size greater than that of its respective fluid outlet, and a depressed surface in each of said heads facing a respective one of said fluid outlets, said valve being normally loose in said chamber and positioned centrally between said fluid outlets, and resistance means in said chamber spaced from said heads and fully spaced at all parts thereof from said valve when the same is in said normal position.

3. A safety device as in claim 2, said valve having free limited movement in its normal position in said chamber, said resistance means becoming engaged by and resisting the movement of said valve during its normal limited movement from its normal position in response to centrifugal forces acting thereagainst and being yieldable to permit the movement of said valve from beyond said normal position in response to the pressure of the fluid acting against said surfaces to move said valve in the direction of said fluid outlet of lower fluid pressure.

4. In a device for a fluid pressure system comprising a fluid chamber, a fluid inlet in said chamber to introduce fluid thereinto under pressure, at least a pair of fluid outlets in said chamber to exhaust fluid therefrom, said fluid outlets each having an entranceway and an enlarged flat sealing surface about said entranceway directed radially therefrom, a valve in said chamber normally spaced from said outlets and movable to close a respective one thereof when fluid pressure in said respective outlet is lower than that in the other of said outlet, surfaces on said valve against which said fluid under pressure exerts a force to move said valve in the direction of said outlet having said lower fluid pressure, said valve having ends thereon each of which has a surface tapering radially outward and terminating in an enlarged head of a size greater than that of its respective fluid outlet, said tapering surface being acted upon by the fluid in said chamber to exert a force on its respective head to move the valve and said head toward its respective outlet when the fluid pressure in its respective outlet is lower than that in the other of said outlets, the end of each of said heads having a radially directed flat sealing surface facing the flat sealing surface of its respective fluid outlet to seat flat thereagainst in fluid-tight sealing engagement therewith, a concave surface defined in each of said ends of said heads in facing relationship with its respective fluid outlets, and one of said concave surfaces being acted upon by a differential in fluid pressure at its respective end of said valve to cause said valve to move in the direction of its respective outlet when the fluid pressure at such outlet is lower than that at the other of said outlets, and resistance means about and free of engagement with said valve ends and free of touching engagement with said valve when the same is normally spaced from said outlets and exerting a returning force on said valve when the same has moved from its normal position.

5. A safety device for a fluid pressure system comprising a housing having a fluid containing chamber, a fluid inlet to introduce fluid into said chamber under pressure, a plurality of fluid outlets to exhaust fluid from said chamber, a valve loose in said chamber having surfaces thereon against which the fluid in said chamber exerts a force to space said valve normally from said fluid outlets when the fluid pressure in said outlets is equal to that of the fluid pressure in said inlet and to move said valve to close one of said fluid outlets when the fluid pressure therein is lower than that of said fluid inlet, fluid passages in said housing connecting said fluid inlet and outlets to transmit fluid therebetween to prevent the exertion of valve moving fluid pressure against said valve surfaces, valve means in said passages to open and close the same, means in said chamber normally free of engagement with and applying no resistance to the initial movement of said valve when the same is in its normal position and engageable with and yieldable in response to the movement of said valve toward said one fluid outlet in response to the fluid pressure exerted on said surfaces, said valve having enlarged heads free of engagement with said resistance means and facing said fluid outlets and being of a size to fully cover the same, a depressed surface defined in the end of each of said heads facing said fluid outlets, a seat defined at the end of each of said heads facing said fluid outlets, and a valve seat surrounding each fluid outlet against which the seat of said head may fluid tightly engage to close said fluid outlet.

References Cited in the file of this patent

UNITED STATES PATENTS

| | | |
|---|---|---|
| 2,074,889 | Brannan | Mar. 23, 1937 |
| 2,854,016 | Margida | Sept. 30, 1958 |
| 2,900,166 | Boosman | Aug. 18, 1959 |

FOREIGN PATENTS

| | | |
|---|---|---|
| 112,740 | Australia | Mar. 14, 1941 |
| 807,536 | Great Britain | Jan. 14, 1959 |
| 837,532 | Great Britain | June 15, 1960 |